No. 881,102. PATENTED MAR. 3, 1908.
W. C. BAKER.
ANTIFRICTION BEARING.
APPLICATION FILED APR. 2, 1906.
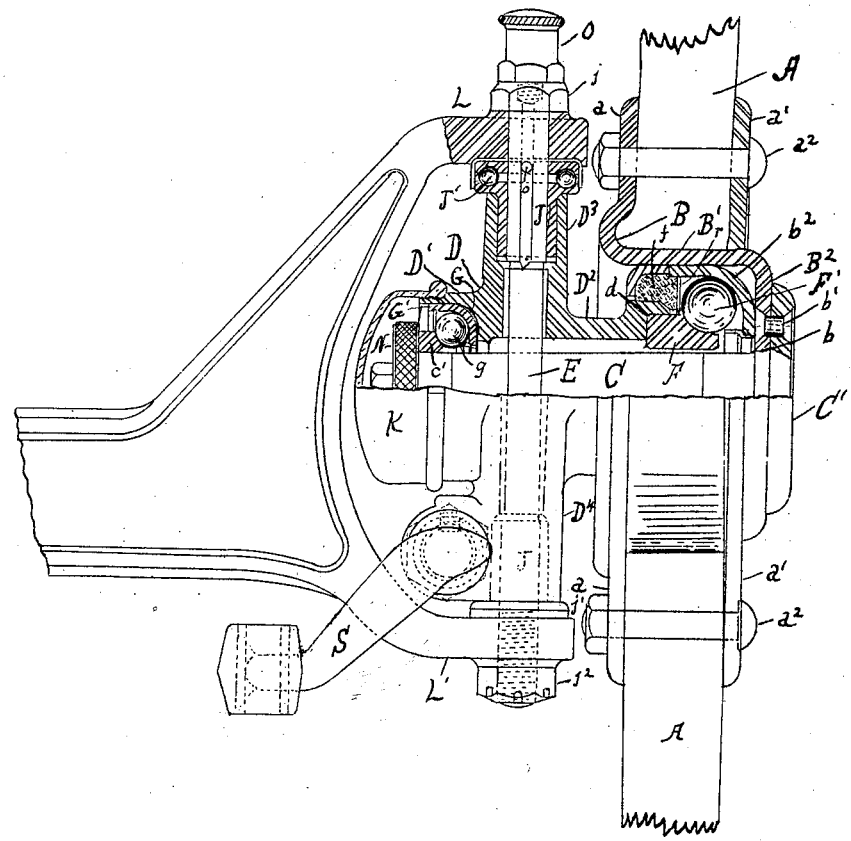
WITNESSES:
W. F. Donnelly
A. A. Boehlke
INVENTOR
Walter C. Baker
BY W. F. Donnelly
his ATTORNEY

UNITED STATES PATENT OFFICE.

WALTER C. BAKER, OF CLEVELAND, OHIO, ASSIGNOR TO THE AMERICAN BALL-BEARING COMPANY, OF CLEVELAND, OHIO, A CORPORATION OF OHIO.

ANTIFRICTION-BEARING.

No. 881,102.

Specification of Letters Patent.

Patented March 3, 1908.

Application filed April 2, 1906. Serial No. 309,387.

*To all whom it may concern:*

Be it known that I, WALTER C. BAKER, a citizen of the United States, residing at Cleveland, in the county of Cuyahoga and State of Ohio, have invented certain new and useful Improvements in Antifriction-Bearings; and I do hereby declare the following to be a full, clear, and exact description of the invention, such as will enable others skilled in the art to which it pertains to make and use the same.

My invention relates to anti-friction bearings, more especially applicable to the front axles, and the steering mechanism thereof.

One of the primary objects of this invention is to eliminate the outward extension of the hub portion of the steering wheel, by so mounting the wheels in relation to the spindle, that the spindle extends inwardly, while at the same time attaining a rigid mounting and an easily running wheel.

Another object of this invention is to so mount the wheels upon their spindles, that the main stress sustaining bearing is mounted within the line of the tread of the wheel, which bearing may be an anti-friction bearing either of the ball, roller, or analogous type; and to so mount and locate the sustaining bearings at either end of the spindle and hub portion, as to allow of the steering knuckle with its sustaining spindle to be located intermediate between the two bearings.

Another object of this invention is to so arrange and assemble the parts, that in the main sustaining bearings, the anti-friction members, such as balls, rollers, or analogous bearings, are mounted so as to traverse within the journals or races, sustained mainly by the knuckle rams, which form part of the knuckle joint; and also mounting the steadying or anti-friction bearings, either balls, rollers, or other anti-friction bearings, so that they traverse within the journals or races supported by the inner end of the spindle, thus bringing the main stress of the weight upon the knuckle joint, instead of upon any part of the spindle, and causing the spindle to act only as a means for bracing or steadying the wheel.

Other objects of this invention will appear hereinafter the above being some of the main or principal objects.

This invention consists first in the mechanism and assemblage of parts which act in coöperation: whereby the steering knuckle is located intermediate between the two bearings, which are adjacent the ends of the spindle. Second in locating the steering knuckle between the two bearings, one of which is located within the tread of the wheel, and the other interior of the tread of wheel, and interior of the steering the wheel, and interior of the steering knuckle. Third this invention consists in locating antifriction bearings and their cooperating mechanism, ball roller, or analogous bearings, one within the line of the tread of the wheel, and the other interior of the tread of the wheel, with the steering knuckle or mechanism, also located interior of the wheel, said steering knuckle forming the main support for the bearings within the line of the tread of the wheel, in combination with the spindle which forms the bearing portion at the opposite end of the spindle, for the anti-friction devices.

This invention further consists in the parts and combination of parts, all of which will be hereinafter fully set forth and claimed.

In the drawing the figure illustrates an anti-friction bearing embodying my invention, the upper portion of which is shown in section to illustrate the internal construction and arrangement; the lower portion showing the outer contour of the parts. This figure is an illustration in side elevation.

It will be understood that while I have illustrated, a type of anti-friction bearings which embody balls, rollers, or analogous bearings, that I do not wish to be limited to the style of the bearings, inasmuch as they may be modified, and undoubtedly will be modified according to requirements or convenience. Heretofore and before my invention, as illustrated in a patent granted to me Mar. 1, 1904, for anti-friction bearings No. 753,820, I have illustrated and described an anti-friction bearing, in connection with a steering knuckle, which embodies the placing of two sets of anti-friction bearings intermediate between the spindle and the hub, adjacent the ends thereof, said antifriction bearings being of different sizes, the larger of said anti-friction bearings being located in line with the traction or tread of the wheel, and the steering knuckle which is carried by the spindle is in juxtaposition to the larger anti-friction bearings. In this device however the hub portion extended outwardly from the wheel, and the smaller anti-friction bearings were located at the outer end, and the steering knuckle while located in juxtaposition to the larger anti-friction bearings was located inside of both bearings and inside of the wheel. I have found however that it is desirable in some cases to eliminate the outwardly extending portion of the hub in order to allow the vehicle to pass through narrower openings, or along narrower thoroughfares. I have also found that less danger arises when passing other vehicles of interference or engagement of the vehicle, when the outwardly extending portion of the hub was eliminated;
but I have found it desirable to have one of the bearings within the line of the tread of the wheel, and the other beyond the tread of the wheel, the former to sustain the load, and the latter to support the wheel and bearings, and hence the utility and novelty of my invention.

Referring to the drawing, A represents a vehicle wheel the spokes and hub portion only of which are shown in the drawing.
B represents the hub portion of the wheel, the spoke portion being held to the hub in any suitable manner, one manner being shown in the drawing, comprising flanges $a$, $a'$. The flanges $a$, $a'$, comprising an annular disk having orifices for the reception of the securing bolt $a^2$. The space between the flanges $a$, $a'$, is adapted to receive the inner end of the spoke of the wheel A. However instead of using this construction, other constructions may be used, such as wire spokes, secured in the well known manner.

As illustrated in the drawing the inner flange $a$, is continuous with a cup shaped recess B' which may be formed by pressing, drop forging, or casting the metal of which it is composed into shape. The portion thus far described forms the hub proper of the wheel.

At the outer portion of the cup or hub portion B' it is formed with a radially inwardly extending flange $B^2$ having an orifice $b$, at its central portion, for the admission of the spindle C, this spindle being provided with a cap or head C' overlapping the orifice $b$, and secured to the flange of the hub proper B, by means of a bolt, set screw, or rivet, such as $b'$, this forms or constitutes an attachment between the hub B of the wheel, and the spindle C, causing the spindle to revolve with the wheel when the wheel is in motion.

Interior of the cup or hub proper B I locate a cup race $b^2$ which in this case is shown as a ball race, but which may be a roller race where such bearings are employed.

D represents the steering knuckle formed approximately + shaped having horizontal arms, D', $D^2$, and vertical arms $D^3$, $D^4$. The vertical arms $D^3$, $D^4$, are preferably cast or formed outside of the line of the spindle C, so that the bearings E, of the same will not interfere with the action of said spindle but will be clear of the same.

The arms D', $D^2$, of the knuckle entirely support the wheel and the weight, and are formed strong enough for this purpose.

The outer arm $D^2$ which is approximately formed cylindrical, is shown as being provided with an annular recess $d$ into which fits a cone F, which cone is supported within said annular recess $d$, free of the spindle C.

Mounted upon the cone F which forms part of the race is a large anti-friction bearing F' in this case shown as a ball, which in connection with the cup race $b^2$ forms the race for the anti-friction bearing.

It will be seen that the entire weight is borne upon the arm $D^2$ of the knuckle D.

For the purpose of eliminating dust or foreign matter from the interior of the race, I provide an annular ring $r$, against which is placed an annular ring of felt or like material $f$. The ring $r$, is held in place so as not to interfere with the anti-friction bearings, allowing the wheel to revolve freely around the outer end of said arm. It will be seen in this connection that the antifriction device, be it ball, roller or other anti-friction bearing is located within the line of the tread of the wheel.

The arm D' of the knuckle is formed with a cup shaped recess G, which in turn is provided with a cup race G'.

Mounted upon the spindle C at its inner end is a cone $c'$ which is mounted so as to be shifted lengthwise of the spindle, forming in connection with the nut N, a means of adjusting the bearings of both anti-friction devices.

Between the cone $c'$ and the cup race G' are a series of anti-friction bearings $g$, in this case shown to be balls. These bearings are preferably smaller in diameter and in area than the bearings F' as their function is only to act as a support against lateral strain on the wheel, and to keep the same from irregular lateral motion, the main load being borne by the balls or rollers F' located within the hub of the wheel, and in turn transmitted to the arm D' of the knuckle D.

A cap K covers the end of the arm D' of the steering knuckle D, and includes the end of the spindle with its anti-friction bearing, thus excluding any dirt or foreign matter from said bearings, and permitting of easy access for the purpose of removing the parts or adjusting them.

The vertical arms $D^3$, $D^4$, as before stated are located to one side of the vertical center of the knuckle D, and are provided with journals J at the upper and lower end of the same. The journals J in turn are mounted in a two armed fork L, L' the journal J being secured in position at the upper end by means of a nut $j$, and at the lower end by means of lock nuts, $j'$ $j^2$, the nut $j'$ being located at the upper end of the arm L′, and the nut $j^2$ being located at the lower end of the same, at opposite sides of the arm. The lower end of the spindle $c$ being screw threaded so as to engage both nuts, and to allow of the adjustment up and down of the knuckle D, which rests upon the nut $j'$. The object of this being to adjust the ball bearing mechanism J′ located at the upper end beneath the arm L.

An oil cup O communicates with a conduit $o$, which supplies oil for the bearings.

Connected to the lower vertical arm $D^4$ is a steering arm S which in turn is connected to the steering bar (not shown).

The forked piece L, L′ constitutes the front axle of the vehicle, and is connected to the body of said vehicle. The operation of the steering knuckle as far as regards the turning of the wheels for steering purposes, with the exception of the location and construction of the parts, is the same as the ordinary steering mechanism.

As hereinbefore stated I do not wish to be limited to ball bearings, but may employ any bearings, such as ball, roller or any other bearings and hence the details and the assemblage of these details will be altered in the well known manner to accommodate the parts for the reception and operation of the same, and I do not deem it necessary hence to illustrate the various kinds of bearings, and the manner of applying the same to the construction I have described, as it is within the knowledge of any ordinary mechanic skilled in the art.

What I claim is:—

1. A wheel bearing and steering mechanism comprising balls rollers, or other anti-friction devices, one of said anti-friction devices being located within the wheel hub, and within the line of the tread thereof, the other of said anti-friction devices being located inwardly from said wheel, said anti-friction devices being of different sizes, and the larger of said anti-friction devices being located in a line with the traction and tread of the wheel, and a steering knuckle located between the two bearings.

2. An anti-friction bearing and steering mechanism for wheels comprising ball, roller, or analogous devices, located one within the line of the traction or tread of the wheel, and the other located inwardly from said wheel, and a steering knuckle which supports the ball, roller or analogous bearings located and operating within the wheel hub, said steering knuckle being provided on its inner end with ball, roller or other anti-friction bearings operating in connection with the spindle in turn connected to the wheel hub in combination with the wheel and its hub.

3. In a combined steering knuckle and wheel journal, a horizontally rotating steering knuckle provided with bearings interposed between the steering knuckle and the races upon which said bearings travel, one of said bearings being larger than the other and located in line with the tread of the wheel, one of said bearings being located so as to project inwardly from the wheel, the mounting upon which said knuckle rotates being located intermediate between the two bearings, as and for the purpose set forth.

4. A steering knuckle for motor vehicles comprising bearings, located interior of the hub of the wheel, and in line with the tread of the wheel, also bearings located exterior of the hub of the wheel, and projecting inwardly therefrom, both of said bearings coacting with the steering mechanism, with the steering mechanism forming the main support for the wheel, substantially as set forth.

Signed at Cleveland in the county of Cuyahoga and State of Ohio, this 21 day of March, 1906.

WALTER C. BAKER.

Witnesses:
E. B. DONNELLY,
A. A. BOEHLKE.